United States Patent
Odom et al.

(10) Patent No.: US 11,382,265 B1
(45) Date of Patent: Jul. 12, 2022

(54) REMOVABLY ATTACHABLE ADJUSTABLE CUTTING APPARATUS AND METHOD

(71) Applicant: LANE SHARK USA, LLC, Pensacola, FL (US)

(72) Inventors: Travis William Odom, Pensacola, FL (US); Charles Terry Marsh, McDavid, FL (US)

(73) Assignee: LANE SHARK USA, LLC, Pensacola, FL (US)

( * ) Notice: Subject to any disclaimer, the term of this patent is extended or adjusted under 35 U.S.C. 154(b) by 0 days.

(21) Appl. No.: 17/506,454

(22) Filed: Oct. 20, 2021

Related U.S. Application Data

(63) Continuation of application No. 16/679,706, filed on Nov. 11, 2019, which is a continuation of application No. 16/253,290, filed on Jan. 22, 2019, now Pat. No. 10,470,364.

(60) Provisional application No. 62/623,630, filed on Jan. 30, 2018.

(51) Int. Cl.
*A01D 34/86* (2006.01)
*A01D 34/64* (2006.01)
*A01D 34/74* (2006.01)
*A01D 34/82* (2006.01)
*A01D 101/00* (2006.01)

(52) U.S. Cl.
CPC ........... *A01D 34/866* (2013.01); *A01D 34/64* (2013.01); *A01D 34/74* (2013.01); *A01D 34/82* (2013.01); *A01D 2034/645* (2013.01); *A01D 2101/00* (2013.01)

(58) Field of Classification Search
CPC ...... A01D 34/866; A01D 34/64; A01D 34/74; A01D 34/82; A01D 2034/645; A01D 2101/00
See application file for complete search history.

(56) References Cited

U.S. PATENT DOCUMENTS

| | | | |
|---|---|---|---|
| 3,195,249 A | 7/1965 | Collins | |
| 3,197,948 A * | 8/1965 | Danford | A01D 67/005 56/11.9 |

(Continued)

FOREIGN PATENT DOCUMENTS

| | | |
|---|---|---|
| DE | 4139661 C1 | 2/1993 |
| DE | 19921761 A1 | 5/2000 |
| GB | 2050790 A * | 1/1981 ........... A01D 34/866 |

OTHER PUBLICATIONS

Answer to Complaint by Trailblazer Attachments, LLC filed in U.S. District Court for the Eastern District of Tennessee Southern Division, *Lane Shark US, LLC v. Titan Implement, LLC and Trailblazer Attachments, LLC*, Case No. 1:19-CV-00326 (Date Dec. 16, 2019).

(Continued)

*Primary Examiner* — Alicia Torres
(74) *Attorney, Agent, or Firm* — Dorsey & Whitney LLP

(57) ABSTRACT

A removably attachable adjustable cutting apparatus and method includes a cutting deck, a mounting plate, a main pivot point in the mounting plate and a main adjustable arm with a first end connected with the mounting plate at the main pivot point and with a second end connected with the cutting deck such that the cutting deck is adjustable from a horizontal to a vertical position and positions in between.

8 Claims, 6 Drawing Sheets

(56) References Cited

U.S. PATENT DOCUMENTS

| | | | | |
|---|---|---|---|---|
| 3,483,683 | A | * | 12/1969 | Mccanse .............. A01D 34/63 56/10.7 |
| 3,483,905 | A | | 12/1969 | Lawrence |
| 3,490,213 | A | | 1/1970 | Pinto |
| 3,574,989 | A | | 4/1971 | Rousseau et al. |
| 3,599,406 | A | | 8/1971 | Akgulian et al. |
| 4,154,455 | A | | 5/1979 | Murphy |
| 4,195,860 | A | | 4/1980 | Helams |
| 4,241,565 | A | * | 12/1980 | Parsons, Jr. .......... A01D 34/866 56/10.7 |
| 4,445,312 | A | | 5/1984 | Cartner |
| 4,802,327 | A | * | 2/1989 | Roberts ............... A01D 34/866 56/10.4 |
| 4,912,916 | A | * | 4/1990 | Parsons, Jr. .......... A01D 34/866 56/15.2 |
| 5,343,680 | A | | 9/1994 | Reichen et al. |
| 5,392,593 | A | * | 2/1995 | Emery ................. A01D 34/866 56/15.2 |
| 5,435,117 | A | | 7/1995 | Eggena |
| 5,459,984 | A | | 10/1995 | Reichen et al. |
| 5,657,620 | A | | 8/1997 | Thagard et al. |
| 6,308,503 | B1 | | 10/2001 | Scag et al. |
| 6,347,503 | B1 | | 2/2002 | Esau et al. |
| 6,662,835 | B1 | | 12/2003 | Gengler |
| 7,093,414 | B2 | | 8/2006 | Washburn |
| 7,175,380 | B2 | | 2/2007 | Wilson et al. |
| 9,554,514 | B2 | | 1/2017 | Marotte |
| 2002/0104301 | A1 | | 8/2002 | Langworthy et al. |
| 2006/0010846 | A1 | | 1/2006 | Koehn |
| 2006/0026938 | A1 | | 2/2006 | Cartner |
| 2007/0074496 | A1 | | 4/2007 | Sundberg et al. |
| 2009/0100817 | A1 | | 4/2009 | Godfrey |
| 2012/0049035 | A1 | | 3/2012 | Black et al. |
| 2014/0026528 | A1 | | 1/2014 | Thiboutot |
| 2015/0052867 | A1 | | 2/2015 | Castelli et al. |
| 2016/0076219 | A1 | | 3/2016 | Martinez et al. |
| 2016/0106020 | A1 | | 4/2016 | Akahane |
| 2017/0071126 | A1 | | 3/2017 | Eubanks |
| 2018/0338421 | A1 | | 11/2018 | Christian |
| 2019/0289789 | A1 | | 9/2019 | Grice |
| 2021/0219491 | A1 | * | 7/2021 | Markham .............. A01D 34/74 |
| 2021/0227748 | A1 | * | 7/2021 | Thompson ........... A01D 34/662 |
| 2021/0329833 | A1 | * | 10/2021 | Steiner ................. A01D 34/74 |

OTHER PUBLICATIONS

Complaint filed in U.S. District Court for the Eastern District of Tennessee Southern Division, *Lane Shark US, LLC v. Titan Implement, LLC and Trailblazer Attachments, LLC*, Case No. 1:19-CV-00326 (Date Nov. 14, 2019).

Declaration of Charles Terry Marsh filed in U.S. District Court for the Eastern District of Tennessee Southern Division, *Lane Shark US, LLC v. Titan Implement, LLC and Trailblazer Attachments, LLC*, Case No. 1:19-CV-00326 (Date Dec. 9, 2019).

Declaration of Duerwood Willis II filed in U.S. District Court for the Eastern District of Tennessee at Chattanooga, *Lane Shark US, LLC v. Titan Implement, LLC and Trailblazer Attachments, LLC*, Case No. 1:19-CV-00326 (Date Jan. 6, 2020).

Declaration of Gordan Howell filed in U.S. District Court for the Eastern District of Tennessee Southern Division, *Lane Shark US, LLC v. Titan Implement, LLC and Trailblazer Attachments, LLC*, Case No. 1:19-CV-00326 (Date Dec. 9, 2019).

Declaration of Kyler Kaeser filed in U.S. District Court for the Eastern District of Tennessee Southern Division, *Lane Shark US, LLC v. Titan Implement, LLC and Trailblazer Attachments, LLC*, Case No. 1:19-CV-00326 (Date Jan. 7, 2020).

Declaration of Mark Miller filed in U.S. District Court for the Eastern District of Tennessee Southern Division, *Lane Shark US, LLC v. Titan Implement, LLC and Trailblazer Attachments, LLC*, Case No. 1:19-CV-00326 (Date Dec. 9, 2019).

Declaration of Travis Odom filed in U.S. District Court for the Eastern District of Tennessee Southern Division, *Lane Shark US, LLC v. Titan Implement, LLC and Trailblazer Attachments, LLC*, Case No. 1:19-CV-00326 (Date Dec. 9, 2019).

Defendants Brief filed in U.S. District Court for the Eastern District of Tennessee at Chattanooga, *Lane Shark US, LLC v. Titan Implement, LLC and Trailblazer Attachments, LLC*, Case No. 1:19-CV-00326 (Date Dec. 31, 2019).

Ferri, Product description and owner's manual for boom mowers for agriculture and green areas light green maintenance, models T250A, T320A, T320A/R, available at: http://www.ferrisrl.it/products/boom-mowers/t-series/t320a accessed Mar. 4, 2020).

Hardee by EVH MFG Co., Operator's and maintenance manual for hydraulic rotary mover, model MITI MIKE—35, released Apr. 1, 2012.

Limb Ninja Flyer (n.d.) Retrieved Nov. 13, 2019 from https://www.limbninja.com.

Memorandum Supporting Motion for Preliminary Injunction filed in U.S. District Court for the Eastern District of Tennessee S. Division, *Lane Shark US, LLC v. Titan Implement, LLC and Trailblazer Attachments, LLC*, Case No. 1:19-CV-00326 (Date Dec. 9, 2019).

Motion for Preliminary Injunction filed in U.S. District Court for the Eastern District of Tennessee Southern Division, *Lane Shark USA, LLC v. Titan Implement, LLC and Trailblazer Attachments, LLC*, Case No. 1:19-CV-00326 (Date Dec. 9, 2019).

Reply Supporting Motion for Preliminary Injunction filed in U.S. District Court for the Eastern District of Tennessee Southern Division, *Lane Shark US, LLC v. Titan Implement, LLC and Trailblazer Attachments, LLC*, Case No. 1:19-CV-00326 (Date Jan. 7, 2020).

Sabre Samurai Operator's manual, available at: https://www.cullliat.com/wp-content/uploads/2016/04/Sabre-Samurai-Manual.pdf (accessed Mar. 4, 2020).

Third Declaration of Travis Odom filed in U.S. District Court for the Eastern District of Tennessee Southern Division, *Lane Shark US, LLC v. Titan Implement, LLC and Trailblazer Attachments, LLC*, Case No. 1:19-CV-00326 (Date Jan. 7, 2020).

Titan Attachments, Flail mower owner's manual for model Nos. AGL125, AGL145 and AGL165, available at: http://www.titanmanuals.com/pdfs/AGL.pdf (accessed Mar. 4, 2020).

Unopposed Motion for Leave to Exceed Page Limit filed in U.S. District Court for the Eastern District of Tennessee Southern Division, *Lane Shark US, LLC v. Titan Implement, LLC and Trailblazer Attachments, LLC*, Case No. 1:19-CV-00326 (Date Dec. 9, 2019).

\* cited by examiner

REMOVABLY ATTACHABLE ADJUSTABLE CUTTING APPARATUS AND METHOD

CROSS REFERENCE TO RELATED APPLICATIONS

This is a continuation of U.S. patent application Ser. No. 16/679,706, filed on 11 Nov. 2019, now U.S. Pat. No. 11,284,563, which is a continuation of U.S. patent application Ser. No. 16/253,290, filed on 22 Jan. 2019, now U.S. Pat. No. 10,470,364, which claims the benefit of Provisional Application No. 62/623,630 filed 30 Jan. 2018, the disclosures of which are incorporated, in their entireties, by this reference.

FIELD OF THE INVENTION

This invention relates to a removably attachable adjustable cutting apparatus and method. In particular, in accordance with one embodiment, the invention relates to a removably attachable adjustable cutting apparatus consisting of a cutting deck, a mounting plate, a main pivot point in the mounting plate and a main adjustable arm with a first end connected with the mounting plate at the main pivot point and with a second end connected with the cutting deck such that the cutting deck is adjustable from a horizontal to a vertical position and positions in between.

BACKGROUND OF THE INVENTION

A problem exists with regard to the use of cutting devices. By way of example only and not by limitation, large cutting devices available in the prior art are fixed devices in operation. That is, the cutting devices are not manipulable in any manner except for minor movements up and down. No known cutting devices include the ability to mechanically rotate the cutting device for cutting at an angle, for example only and not by limitation. Further, known cutting devices generally are permanently attached to a machine and are not capable of being removed from one machine and attached to another machine. Those few known cutting devices that are removable are only attachable to one particular machine.

Thus, there is a need in the art for a cutting device that is adjustable for attachment to, and use with, a variety of other machines and that is adjustable up and down and that is mechanically rotatable for use from horizontal to vertical, and positions in between as well, as desired.

It therefore is an object of this invention to provide an improved removably attachable adjustable cutting device that is connectable with a variety of machines, that is adjustable both up and down and is rotatable such that cutting at an angle, from horizontal to vertical and positions in between, is provided and that is easy to use and economical in construction.

SUMMARY OF THE INVENTION

Accordingly, the a removably attachable adjustable cutting apparatus of the present invention, according to one embodiment, includes a cutting deck, a mounting plate, a main pivot point in the mounting plate and a main adjustable arm with a first end connected with the mounting plate at the main pivot point and with a second end connected with the cutting deck such that the cutting deck is adjustable from a horizontal to a vertical position and to any position in between.

All terms used herein are given their common meaning as easily understood with reference to the Figures described herein and the description that follows.

According to another aspect of the invention, the mounting plate further includes machine attachment devices for connecting the mounting plate to a machine. In one aspect, the machine attachment devices are configured so as to connect with machines that are selected from a group of machines attachment devices consisting of; SSQA machines and JOHN DEERE brand machines.

In one aspect, the apparatus further includes a blade carrier in the cutting deck. In another aspect, the apparatus further includes at least one cutting blade connected with the blade carrier.

In another aspect, the apparatus further includes rotation adjustment holes at the main pivot point for use in combination with a locking pin to lock the cutting deck at a selected position.

According to another embodiment, the removably attachable adjustable cutting apparatus includes a cutting deck, a mounting plate where the mounting plate further includes machine attachment devices for connecting the mounting plate to a machine, and a main pivot point in the mounting plate. A main adjustable arm is provided with a first end connected with the mounting plate at the main pivot point and with a second end connected with the cutting deck such that the cutting deck is adjustable from a horizontal to a vertical position and to positions in between.

Also, a blade carrier is provided in the cutting deck and at least one cutting blade is connected with the blade carrier.

In a further aspect, the machine attachment devices are configured so as to connect with machines that are selected from a group of machines consisting of: Skid Steer Quick Attach (SSQA) attachment devices and hook and pin attachment devices. As is known SSQA machines and JOHN DEERE brand machines, for example only and not by limitation, use different devices for connection, as in the plates used in the SSQA system and the hook and pin system for others.

In one aspect, the apparatus further includes rotation adjustment holes at the main pivot point for use in combination with a locking pin to lock the cutting deck at a selected position.

In another aspect, the invention further includes an adjustment support arm with a first end and a second end where the first end is connectable with the main adjustable arm and the second end is connectable with the cutting deck such that the cutting deck is supported by the adjustment support arm.

In one aspect, the invention further includes a main adjustment hinge connected with the cutting deck where the second end of the main adjustable arm is connected with the main adjustment hinge.

In yet another aspect, the invention further includes a pair of deck supports connected with the cutting deck where a first deck support includes an adjustment support arm connection and where the second deck support includes a main adjustment hinge.

In still another aspect, the invention further includes a first lock bracket on the main adjustable arm and a second lock bracket on the cutting deck and a spaced apart pair of tower locks on the cutting deck where the first lock bracket and the second lock bracket are both configured to fit within and connect with the pair of tower locks.

According to another embodiment, a removably attachable adjustable cutting apparatus more particularly includes a cutting deck where the cutting deck further includes a main adjustment hinge connected with the cutting deck. A mounting plate is provided where the mounting plate further includes machine attachment devices for connecting the mounting plate to a machine. The mounting plate includes a main pivot point and a main adjustable arm with a first end is connected with the mounting plate at the main pivot point. The main adjustable arm has a second end that is connected with the main adjustment hinge such that the cutting deck is adjustable from a horizontal to a vertical position and to positions in between. Further, an adjustment support arm is provided that is connectable with the main adjustable arm and the cutting deck. Also, a blade carrier, connected with a motor, is located in the cutting deck and at least one cutting blade connected with the blade carrier.

In a further aspect, the machine attachment devices are configured so as to connect with machines that are selected from a group of machine attachment devices consisting of: Skid Steer Quick Attach (SSQA) attachment devices and hook and pin attachment devices.

In one aspect, the invention further includes rotation adjustment holes at the main pivot point for use in combination with a locking pin to lock the cutting deck at a selected position.

In another aspect, the invention further includes a pair of deck supports connected with the cutting deck where a first deck support includes an adjustment support connection and where the second deck support includes the main adjustment hinge.

In yet another aspect, the invention further includes a first lock bracket on the main adjustable arm and a second lock bracket on the cutting deck and a spaced apart pair of tower locks on the cutting deck where the first lock bracket and the second lock bracket is configured to fit within and connect with the pair of tower locks.

According to another embodiment, a removably attachable adjustable cutting method consists of:

a. providing a cutting deck; a mounting plate connected with the cutting deck; a main pivot point in said mounting plate; a main adjustable arm with a first end connectable with said mounting plate at said main pivot point and with a second end connected with said cutting deck such that said cutting deck is adjustable from a horizontal to a vertical position and positions in between; and b. connecting the first end of the main adjustable arm with the main pivot point.

In one aspect, the mounting plate further includes machine attachment devices for connecting the mounting plate to a machine and where the machine attachment devices are configured so as to connect with machines that are selected from a group of machine attachment devices consisting of: Skid Steer Quick Attach (SSQA) attachment devices and hook and pin attachment devices and further comprises the step of connecting the mounting plate to a machine using one of the machine attachment devices selected from the group.

In another aspect, the method further includes providing rotation adjustment holes at the main pivot point for use in combination with a locking pin to lock the cutting deck at a selected position.

In one aspect, the method further includes providing an adjustment support arm with a first end and a second end where the first end is connectable with the main adjustable arm and the second end is connectable with the cutting deck such that when connected the cutting deck is supported by the adjustment support arm.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
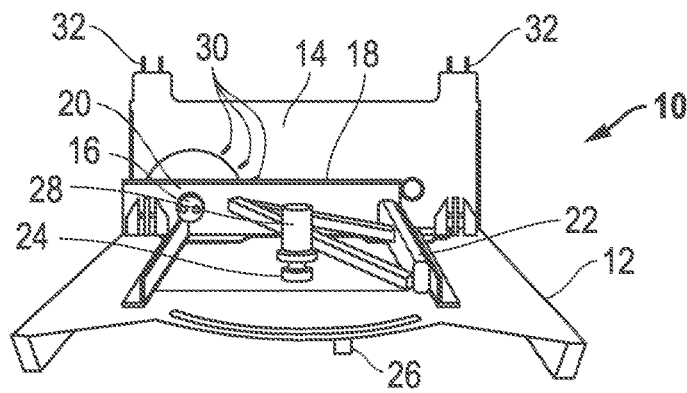
FIG. 1 is a front perspective view of the removably attachable adjustable cutting apparatus of the present invention.
Figure 2:
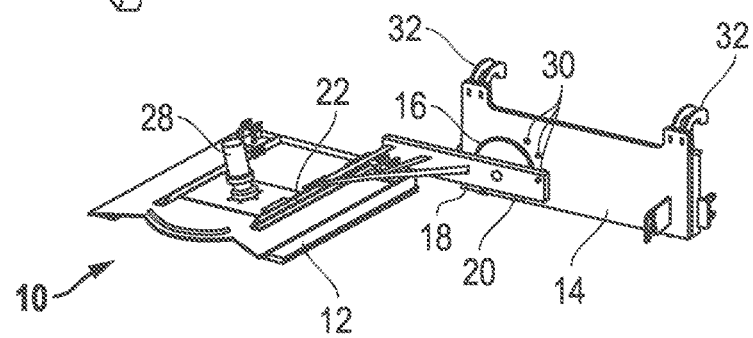
FIG. 2 is a perspective view of the invention of FIG. 1 showing the cutting deck extended horizontally to one side.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described method may be altered so that certain processes are conducted in parallel or independent, with other processes, to the extent that the processes are not dependent upon each other. Thus, the specific order of steps described herein is not to be considered implying a specific sequence of steps to perform the method. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

The preferred embodiment of the present invention is illustrated by way of example in FIGS. 1-15. With specific reference to FIG. 1, removably attachable adjustable cutting apparatus 10 consists of a cutting deck 12, a mounting plate 14, a main pivot point 16 in the mounting plate 14 and a main adjustable arm 18 with a first end 20 connected with the mounting plate 14 at the main pivot point 16 and with a second end 22 connected with the cutting deck 12 such that the cutting deck 12 is adjustable from a horizontal position (See FIG. 1) to a vertical position (See FIG. 3) and any position in between (See FIGS. 4 and 5).

In one aspect, the apparatus 10 further includes a blade carrier 24 in the cutting deck 12. In another aspect, the apparatus further includes at least one cutting blade 26 connected with the blade carrier 24 (See FIG. 4). Blade carrier 24 is configured to support cutting blade(s) 26 as the rotate below cutting deck 12. Further, as is known, blade carrier 24 is configured to connect with a motor 28 for operation of cutting blade(s) 26.

In another aspect, the apparatus 10 further includes rotation adjustment holes 30 at, in close proximity to, the main pivot point 16 for use in combination with a locking pin (not shown) to lock the cutting deck 12 at a selected position.

According to another aspect of the invention, the mounting plate 14 further includes machine attachment devices 32 for connecting the mounting plate 14 to a machine (not shown). In one aspect, the machine attachment devices 32 are configured so as to connect with machines using attachment devices that are selected from a group of machine attachment devices consisting of: Skid Steer Quick Attach (SSQA) attachment devices and hook and pin attachment devices. Machine attachment devices 32 are described more fully and illustrated in the accompanying FIGS. 10 and 11.

Figure 3:
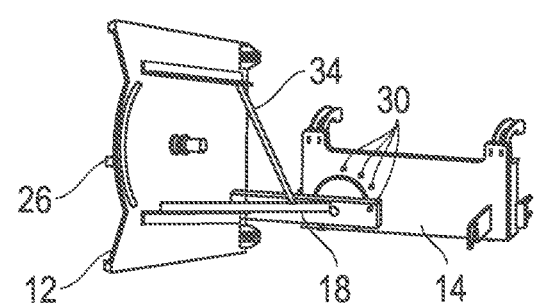
FIG. 3 is a perspective view of the invention of FIG. 1 with the cutting deck extended horizontally to one side and rotated to a vertical position.
Figure 4:
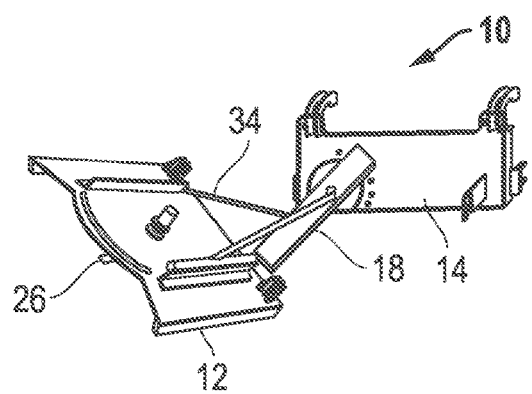
FIG. 4 is a perspective view of the invention of FIG. 1 with the cutting deck extended horizontally and to one side and partially rotated in one direction.
Figure 5:
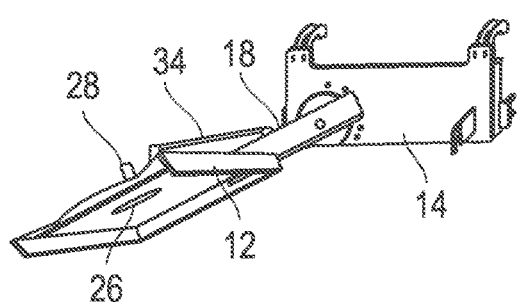
FIG. 5 is a perspective view of the invention of FIG. 4 with the cutting deck partially rotated in an opposite direction.

FIGS. 2-5 illustrate the range of motion of the invention including side to side and horizontal (FIG. 2); side to side and vertical (FIG. 3) extended away from mounting plate 14 horizontally and rotated (FIGS. 3, 4 and 5).

Referring to FIGS. 3, 4 and 5, adjustment support arm 34 with a first end 36 and a second end 38 is illustrated where the first end 36 is connectable with the main adjustable arm 18 and the second end 38 is connectable with the cutting deck 12 such that the cutting deck 12 is supported by the adjustment support arm 34. Applicant has found that adjustment support arm 34 provides increased stability and enhanced operability of cutting deck 12 when in a none horizontal position as shown in the figures.

Figure 6:
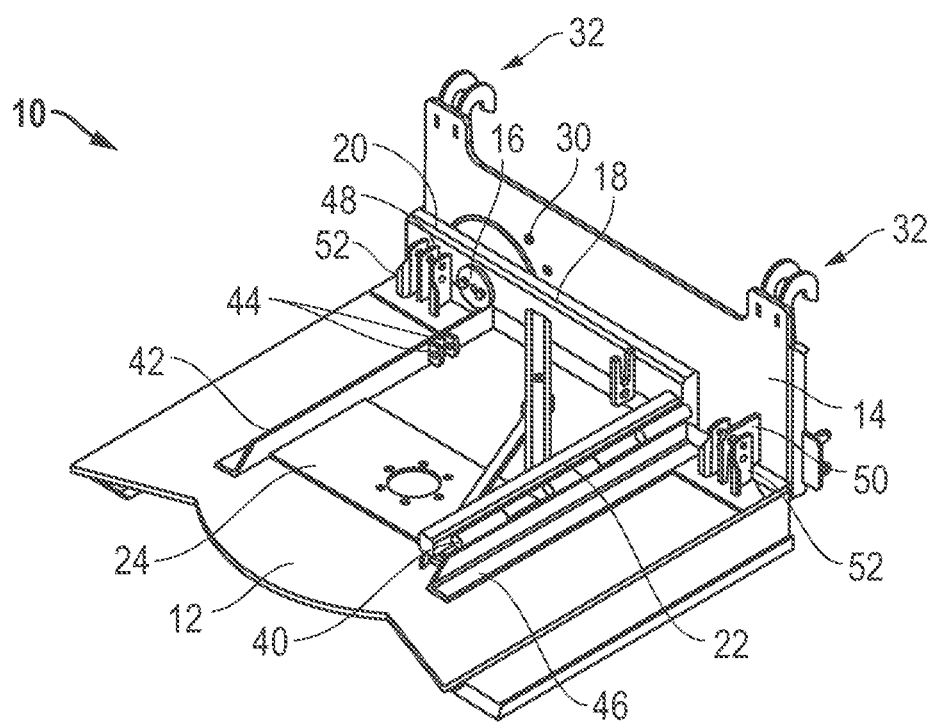
FIG. 6 is a top perspective view of the invention of FIG. 1.
Figure 7:
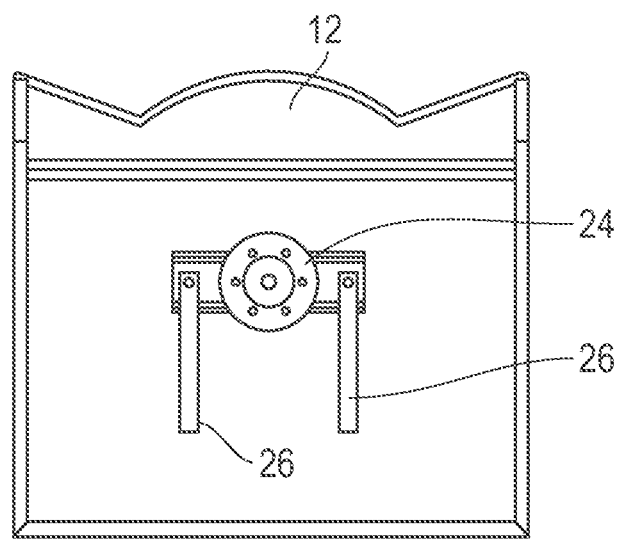
FIG. 7 is a bottom view of the cutting deck of the invention of FIG. 1.

By way of continued description, referring now to FIGS. 6 and 7, FIG. 6 shows the combination of cutting deck 12 connected at main pivot point 16 in mounting plate 14 by means of the connection of the first end 20 of main adjustable arm 18 at main pivot point 16. In operation, any connection that allows main adjustable arm 18 to rotate around main pivot point 16 is suitable, as are known in the art and not described more fully. Connection of second end 22 of main adjustable arm 18 to cutting deck 12 ensures that movement of the main adjustable arm 18 results in movement of cutting deck 12 from any position desired between horizontal and vertical and positions in between as shown. Importantly, this motion is enhanced by the use of a main adjustment hinge 40 connected with the cutting deck 12 where the second end 22 of the main adjustable arm 18 is connected with the main adjustment hinge 40 such that the second end 22 connection rotates within the main adjustment hinge 40 for precise movement and positioning of cutting deck 12.

Still referring to FIG. 6, in yet another aspect, the invention 10 further includes a pair of deck supports connected with the cutting deck 12 where a first deck support 42 includes an adjustment support arm connection 44 and where the second deck support 46 includes the main adjustment hinge 40. One deck support 42 is located on one side of blade carrier 24 and one deck support 44 is located on the other side of blade carrier 24 as shown.

Figure 8:
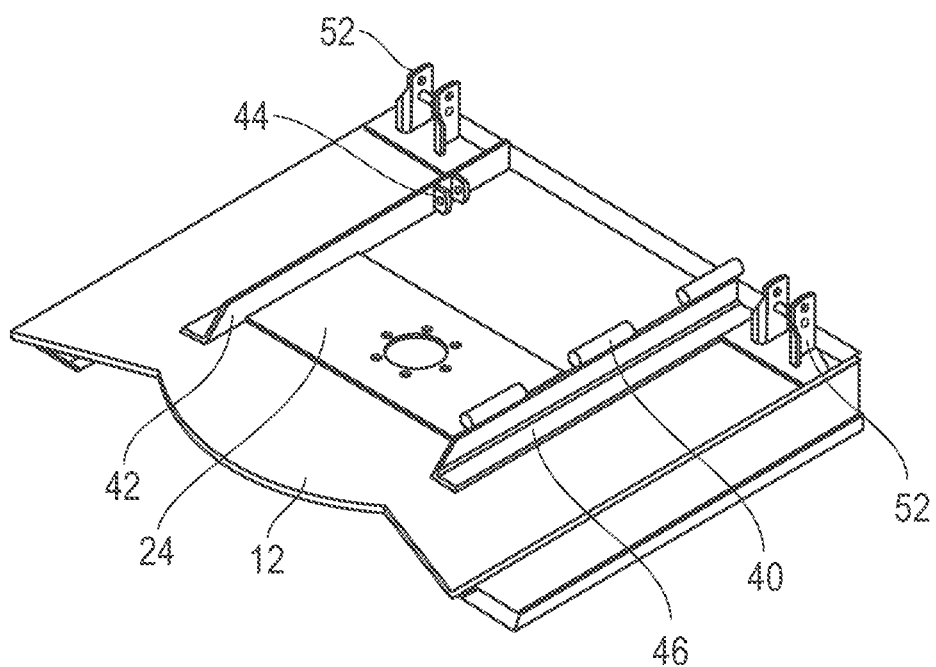
FIG. 8 is a top perspective view of the cutting deck of the invention of FIG. 1.
Figure 9:
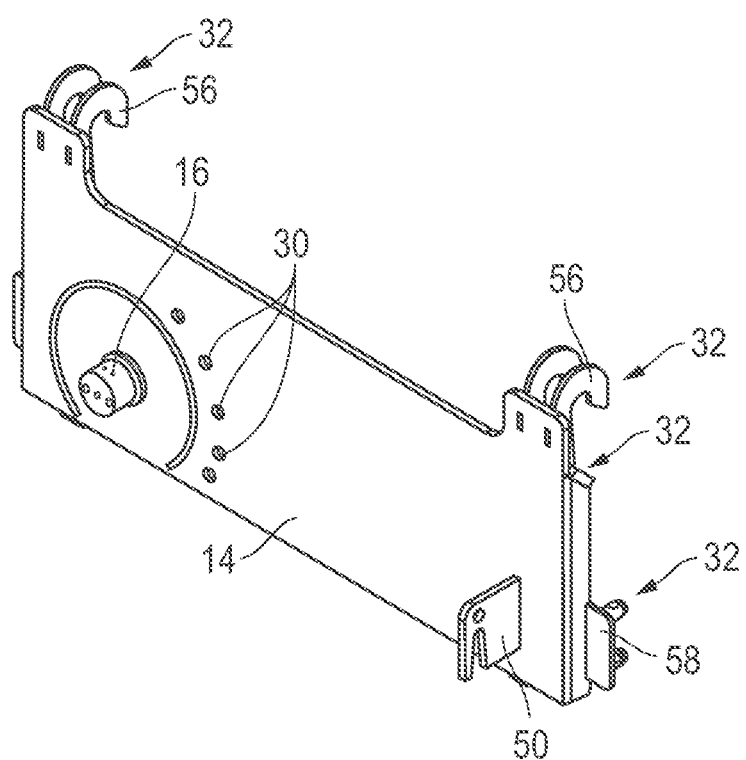
FIG. 9 is a front perspective view of the mounting plate of the invention of FIG. 1.

In still another aspect, referring to FIGS. 6, 8, and 9, the invention 10 further includes a first lock bracket 48 on the main adjustable arm 18 and a second lock bracket 50 on the mounting plate 14 and a spaced apart pair of tower locks 52 on the cutting deck 12 where the first lock bracket 48 and the second lock bracket 50 are both configured to fit within and connect with the pair of tower locks 52. In this manner, cutting deck 12 is capable of being secured in the horizontal position without fear of rotation or movement.

FIG. 7 illustrates the bottom of cutting deck 12 including a pair of cutting blades 26 attached to blade carrier 24 which in turn is connected with motor 28 (not shown). Motor 28 may be an independent motor attached directly to cutting deck 12 or operated by pulley attachments with a motor on a machine or elsewhere (not shown) as is known in the art.

FIG. 8, for clarity, shows the elements of the top of the cutting deck 12 without the main adjustable arm 18.

Figure 10:
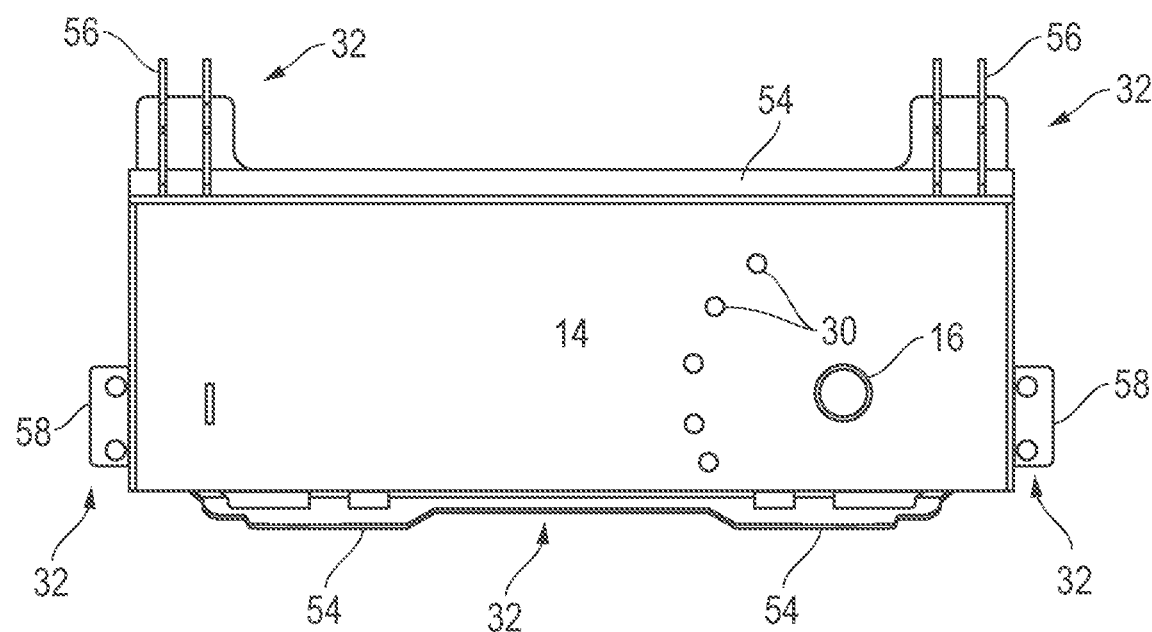
FIG. 10 is a front view of the mounting plate of the invention of FIG. 1 illustrating SSQA and hook and pin attachment devices.
Figure 11:
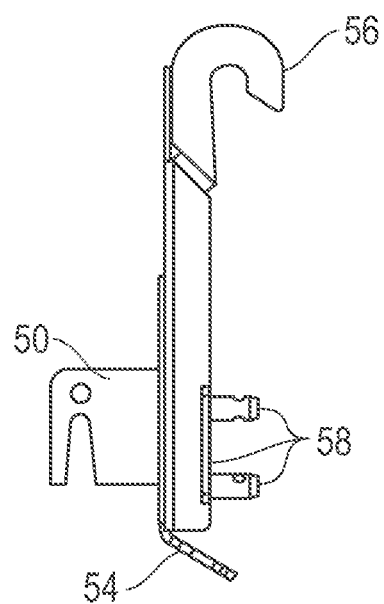
FIG. 11 is a side view of FIG. 10.

FIG. 9 shows, for clarity the elements of mounting plate 14 without the main adjustable arm 18. Also, FIGS. 9, 10 and 11 show two forms of machine attachment devices 32. One form is a Skid Steer Quick Attach (SSQA) attachment device 54 (more clearly shown in FIGS. 10 and 11) and one form is a hook 56 and pin 58 attachment device. The SSQA attachment device 54 is known in the art and as illustrated included extended plates that connect on machines adapted therefor. Attaching SSQA device to the back of mounting plate 14 or attaching hook 56 and pin 58 combinations to the back of mounting plate 14 is all that is required for enabling the present invention to be easily attached to and removed from any and all types of machines. Certainly, any type of connection devices now known or hereafter developed that serve the same function are included within the scope of the present invention.

Figure 12:
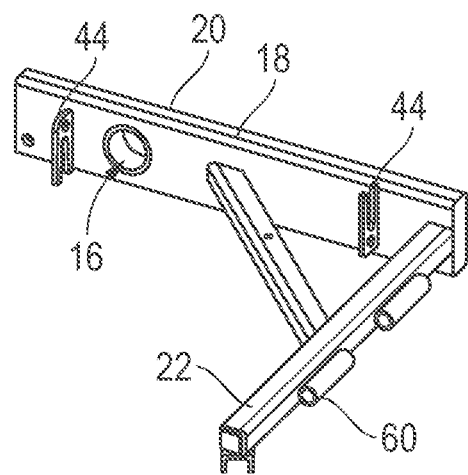
FIG. 12 is a front perspective view of the main adjustable arm of the invention of FIG. 1.

Referring now to FIG. 12, main adjustable arm 18 is the main connection between mounting plate 14 and the cutting deck 12. This connection is made by attaching the main adjustable arm 18 to the mounting plate 14 at the main pivot point 16 (not shown in this figure) and attaching the cutting deck 12 to the main adjustable arm 18, preferably by means of main adjustment hinge 40 as described and shown herein. This allows the cutting deck 12 to move 180 degrees from directly in front of a tractor or other machine (not shown) to the vertical and offset positions as desired all while remaining attached to the mounting plate 14 attached to a machine. Once in any desired location, the main adjustable arm 18 is supported by the adjustment support arm 34 (see FIGS. 3, 4, and 5) so as to stabilize the apparatus.

Preferably, main adjustable arm 18 includes a hinge connection 60 that connects with main adjustment hinge 40. This allows the cutting deck 12 to move 180 degrees around the main adjustable arm 18 from the horizontal "home position" to the vertical position.

Figure 13:
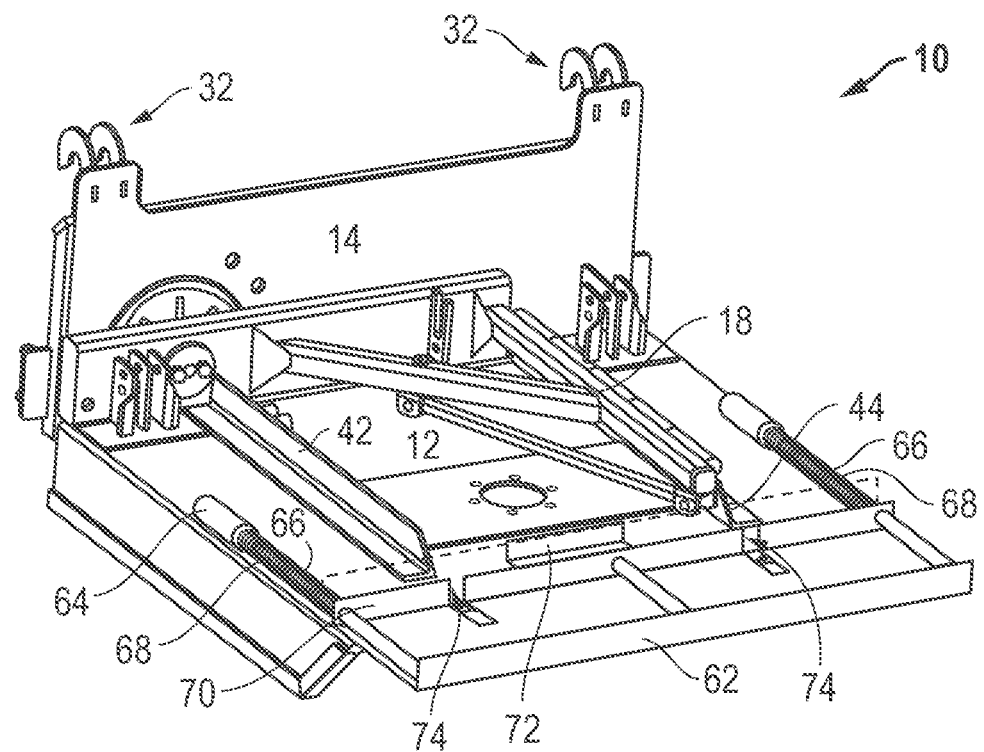
FIG. 13 is a perspective view of the invention of FIG. 1 including a push plate of one design.

Referring now to FIGS. 12 and 13, Applicant has found that a preferred embodiment of the invention includes a "push plate" 62. Push plate 62 as shown in the figures, is attached to the front of cutting deck 12 and serves, when present as the main point of contact for all material prior to the material being impacted by the cutting blades 26. Push plate 62 acts as a guard for the exposed blades 26 when the blades 26 extend past the front of cutting deck 12 and as a guide to compress material for more consistent cutting prior to contact with the cutting blades 26.

Referring specifically to FIG. 13, here push plate 62 is connected to cutting deck 12 by means of a pair of guide cylinders 64 which are connected to cutting deck 12. Guide cylinders 64 are connected with push plate 62 by means of guide pins 66 within a pair of load springs 68, where the guide pins 66 are connected with push plate 62 on one end and enter into guide cylinders 64 as load springs 68 are compressed and push plate 62 moves inward over the top of cutting deck 12 (the position indicated by dotted lines) by impacting material (not shown for clarity). Load springs 68 expand in the absence of contact with material and allow push plate 62 to return to an extended position as shown in FIG. 14.

Preferably, this aspect of the invention push plate 62 further includes a rear safety guard 70 positioned to contact rear brace 72 attached to the top of cutting deck 12. Rearward movement of push plate 62 is prevented from further rearward motion by contact of rear safety guard 70 with rear brace 72 thus preventing push plate 62 from contacting motor 28 (not shown in this figure for clarity), for example.

Further, push plate 62 preferably includes guide slots 74 that fit over first deck support 42 and second deck support 44 to help keep push plate 62 aligned properly.

Figure 14:
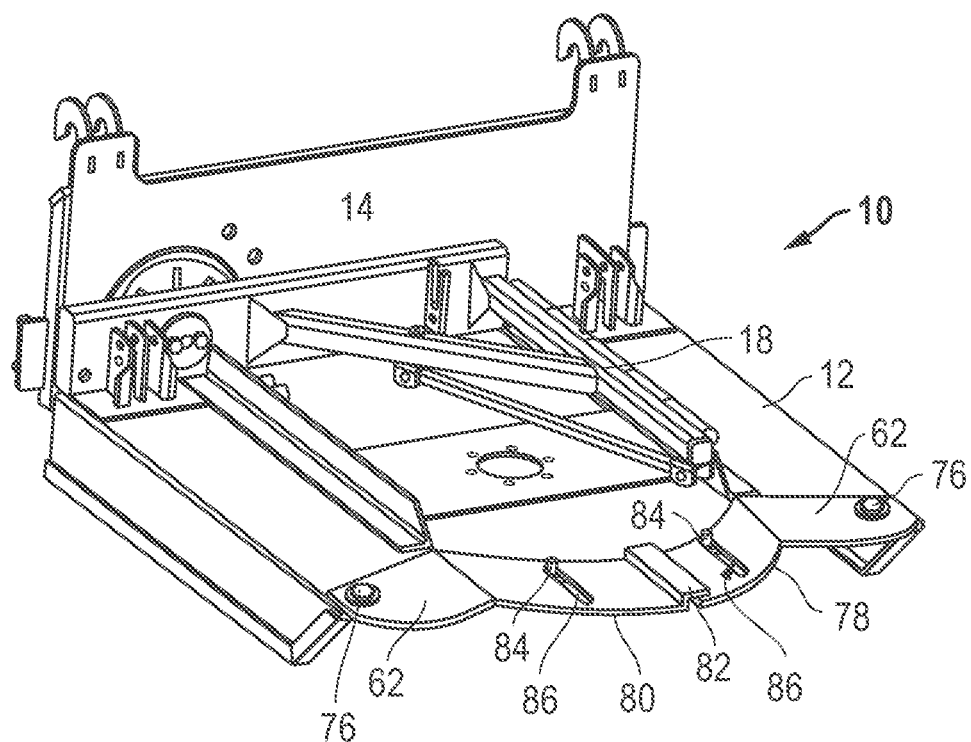
FIG. 14 is a perspective view of a push plate of another design.
Figure 15:
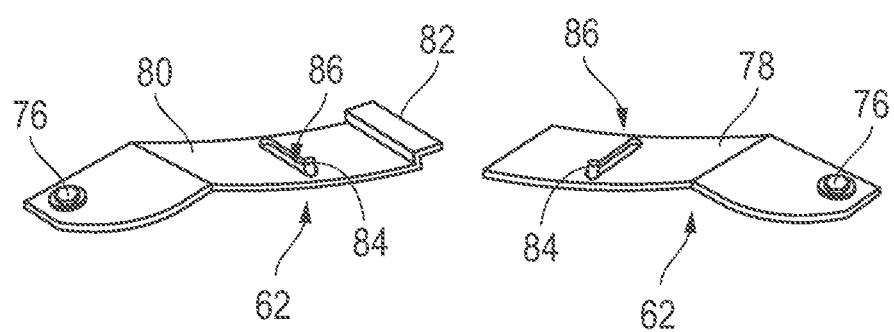
FIG. 15 is a perspective view of the push plate of FIG. 14 after contact with material.

Referring now to FIGS. 14 and 15, another embodiment of push plate 62 is illustrated acting as before as a guard for the exposed cutting blades 26. FIG. 15 shows push plate 62 in extended position and FIG. 16 shows push plate 62 in a collapsed position after contact with material to be cut (not shown). Once the material is cut, push plate 62 returns, via springs not shown, or the like.

In this embodiment, push plate 62 includes a pair of bolts 76 that connects the two separate halves of the push plate, right half 78 and left half 80, in movable relation with cutting deck 12. Bolts 76 allow right half 78 and left half 80 to pivot toward cutting deck 12 when contact with material to be cut is made. Preferably a safety guard 82 overlaps the space between the right half 78 and left half 80 as shown in FIG. 15. Also shown are guide pins 84 connected with the top of cutting deck 12 and fitted within guide slots 86, in this version. The guide pin 84 guide slot 86 combination stabilize both right half 78 and left half 80 while sliding on the top of cutting deck 12.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A cutting apparatus comprising:
   a mounting plate having a forward-facing surface;
   a cutting deck;
   a motor operably coupled to the cutting deck;
   a blade operably coupled to the motor;
   a support structure having a first end coupled to the forward-facing surface of the mounting plate and a second end pivotally coupled to the cutting deck;
   a support arm interconnecting the support structure and the cutting deck, the support structure and the support arm being configured to enable positioning of the cutting deck in a horizontal position, a vertical position, and at least one other position; and
   a mechanical locking mechanism configured to selectively lock the cutting deck in each of the horizontal position, the vertical position, and the at least one other position, wherein the mechanical locking mechanism includes:
   a set of receiving structures including a first receiving structure associated with the horizontal position, a second receiving structure associated with the vertical position and a third receiving structure associated with the at least one other position; and
   at least one pin configured to be selectively inserted into and removed from at least one receiving structure of the set of receiving structures.

2. The cutting apparatus of claim 1, wherein the cutting deck rotates about an axis that is substantially perpendicular to a plane defined by the forward-facing surface of the mounting plate.

3. The cutting apparatus of claim 1, wherein:
   the forward-facing surface of the mounting plate comprises a lateral edge defining a plane; and
   when in the horizontal position, the cutting deck is substantially positioned on a first side of the plane and the mounting plate is positioned on a second side of the plane.

4. The cutting apparatus of claim 1, wherein the forward-facing surface of the mounting plate comprises a periphery, the cutting deck being positioned laterally beyond the periphery when positioned in at least one of the horizontal position, the vertical position, or the at least one other position.

5. A method for repositioning a cutting apparatus, the method comprising:
   providing a cutting apparatus having a mounting plate, a support structure, and a cutting deck;
   removing a locking pin from a first receiving structure of a mechanical locking mechanism, the first receiving structure being associated with a first position where the cutting deck is horizontal;
   repositioning the cutting deck from the first position to a second position where the cutting deck is vertical; and
   inserting the locking pin into a second receiving structure, the second receiving structure being associated with the second position of the cutting deck.

6. The method according to claim 5, further comprising:
   removing the locking pin from the second receiving structure;
   repositioning the cutting deck from the second position to a third position; and
   inserting the locking pin into a third receiving structure, the third receiving structure being associated with the third position of the cutting deck.

7. The method according to claim 5, wherein repositioning the cutting deck from the first position to the second position includes rotating the cutting deck less than 90 degrees.

8. The cutting apparatus of claim 1, wherein the set of receiving structures is located on at least one of the mounting plate.

* * * * *